United States Patent
Breckenridge, Jr.

(10) Patent No.: US 6,422,510 B1
(45) Date of Patent: *Jul. 23, 2002

(54) SHIMMY-FREE AIRCRAFT TAIL WHEEL CONVERSION

(76) Inventor: Gerald H. Breckenridge, Jr., 135 South St., Beedeville, AR (US) 72014

(*) Notice: Subject to any disclaimer, the term of this patent is extended or adjusted under 35 U.S.C. 154(b) by 0 days.

This patent is subject to a terminal disclaimer.

(21) Appl. No.: 09/679,965

(22) Filed: Oct. 5, 2000

Related U.S. Application Data

(63) Continuation-in-part of application No. 09/520,041, filed on Mar. 7, 2000, now Pat. No. 6,257,521.

(51) Int. Cl.⁷ .............................................. B64L 25/00
(52) U.S. Cl. ...................................................... 244/109
(58) Field of Search .............................. 244/109, 100 R, 244/104 R

(56) References Cited

U.S. PATENT DOCUMENTS 6,257,521 B1 * 7/2001 Breckenridge, Jr. ......... 244/109

* cited by examiner

*Primary Examiner*—J. Woodrow Eldred
(74) *Attorney, Agent, or Firm*—Stephen D. Carver

(57) ABSTRACT

A vibration-preventing tail wheel conversion system prevents an aircraft tail wheel from shimmying during the takeoffs and landings. The system retrofits to the original equipment tail wheel fork. A rigid insert in the form of an inverted T comprises a cylindrical base that is pressed down into the upper end of the factory fork assembly and welded therewtihin. A rigid, reduced diameter and coaxially-centered stein projects integrally upwardly from the insert base, with an annular shoulder defined therebetween. An elongated, threaded bolt rigidly penetrates the insert and extends upwardly outwardly for threadable connection to a suitable nut. A hollow, sleeve-like hub is coaxially coupled to the end of the fork assembly, externally surrounding the insert. The hub's lower, internal shoulder contacts and rests against the fork tube and the insert's annular shoulder. An upper shoulder concentrically defined by the hub receives a bearing assembly. The race portion is press-fitted within the shoulder, and the bearing is coaxially pressed against the race for rotation. A castellated nut attached to the upwardly projecting bolt compresses the bearing assembly with suitable washers to maintain the desired degree of firmness.

6 Claims, 3 Drawing Sheets

SHIMMY-FREE AIRCRAFT TAIL WHEEL CONVERSION

CROSS REFERENCE TO RELATED APPLICATION

This application is a continuation-in-part of my prior application Ser. No. 09/520,041, filed Mar. 7, 2000, now U.S. Pat. No. 6,257,521 and entitled Shimmy-Free Aircraft Tail Wheel Assembly, Aircraft Tail Wheel Assembly.

BACKGROUND OF THE INVENTION

I. Field of the Invention

The present invention relates generally to tail wheels for small aircraft. More particularly, my invention relates to a tail wheel conversion system that eliminates jarring or jerking, and other unwanted vibration, thereby preventing tail wheel shimmying.

II. Description of the Prior Art in general, the concept of stability relates to the characteristics of an aircraft in maintaining its course and direction. In flight, the term "stability" is often equated with the ability of the plane to fly itself. Stability can either be static or dynamic. Static stability involves only the return of the disturbed object to its original position. This was the goal of the early airplane designers; that the airplane would try to return to its original orientation (position) after a disturbance, such as a gust of wind. Dynamic stability is concerned with how much time it may take for the object to return to its original position. If the plane eventually returns to its original position, then the system is considered dynamically stable. If it does not, then it is considered dynamically unstable.

The concept of "control" is a science relating to the human experience in flying and handling a given aircraft. The concepts are related, because when "control" is optimized, a given airplane will be relatively easy for the pilot to fly, and highly stable in flight. The small airplanes used at local airports are very stable; they are (good for both beginning pilots and the more experienced pilots. They are very easy to fly and very forgiving of pilot mistakes. Although usually discussed as flight characteristic, stability and control are equally important during takeoff and landing.

When the plane is in contact with the runway, sudden movements to the left or right of the landing surface are disfavored. Stability dictates that the plane move forwardly and decelerate smoothly during a landing without sudden "jerkiness." Similarly, as a plane taking off leaves the runway and breaks contact with the ground, irregular movements caused by runway-contact can affect flight path stability. One significant cause of vibration and jerkiness during takeoffs and landings is the tail wheel assembly, that can vibrate deleteriously when I contact with the runway.

While on the ground, static stability is enhanced by the normal three-point wheels of the aircraft. Usually a single tail wheel assembly at the aircraft rear completes the "third point" necessary for establishing a stable, planar position. With older small planes having "fixed" tail skid assemblies, the tail skid may be permanently oriented in a position parallel with the longitudinal axis of the airframe. In some tail wheel mounting designs, upward or downward movements of the tail wheel are enabled. However, if the tail wheels are mounted too loosely, they will shimmy or vibrate during takeoffs and landings. On the other hand, if they are secured too rigidly, and cannot "give" in response to runway contact, proper handling can be negatively affected during landings. The time periods just before liftoff, and during landings, are often critical, and yet conventional tail wheel mounting assemblies allow the rear to vibrate.

The latter problem can be particular vexatious when operating agri-chemical dispensing airplanes from dirt runways. When the plane takes off, it is full of fuel and agri-chemical, at maximum weight. Jolts or jerking motions imparted by vibrating tail wheel assemblies during takeoffs can be disconcerting, to say the least. When the plane returns for a landing, it is much lighter, and flight characteristics are different than they were immediately after takeoff. During a landing, when the tail wheel makes first contact with the landing surface, a "smooth" and non-jerky transition is desirable. In the fraction of a second that the plane is neither fully airborne nor fully landed, the path of least resistance for wheel movement may not be straight down the runway. In other words, because of wind gusts and numerous other variables, a sleight movement in tail wheel orientation from "true straightness" can decrease stability.

In other words, during takeoffs and landings especially, conventional tail wheel assemblies vibrate, rattle, and shimmy. If the tail wheel assembly is modified to prevent vibration, it must nevertheless be able to "give" slightly when contacting the ground.

SUMMARY OF THE INVENTION

My new shimmy-preventing tail wheel conversion system is adapted for installation upon existing tail wheel or tail fork assemblies. Once installed, the tail wheel is free to rotate about the axis of the spindle in response to predetermined forces during takeoff and landing, but it cannot shimmy or vibrate during flight.

The conversion system must be operatively connected to the hollow, spindle shaft of the conventional tail wheel fork assembly. A rigid insert is pressed down into the upper end of the factory fork assembly. The insert is generally in the form of an inverted T, with an integral coaxially-centered stem projecting integrally upwardly from a cylindrical base. An elongated, shaft rigidly penetrates the insert and extends upwardly for attachment to a bearing assembly as described later. The insert's cylindrical base is coaxially centered within, and welded to the tail wheel fork tube.

A hollow, sleeve-like hub is then coaxially coupled to the end of the fork assembly. The hub externally surrounds the insert. A lower, internal shoulder of the hub axially contacts and rests against the end of the fork tube. The insert shaft (preferably a threaded bolt) coaxially penetrates the hub and emanates upwardly therefrom. An upper hub shoulder receives a bearing assembly. The race portion is press-fitted within the shoulder, and the bearing is coaxially pressed against the race for rotation. The coaxially upwardly projecting threaded bolt receives a castellated nut that compresses the bearing assembly with suitable washers to maintain the desired degree of firmness.

While the tail wheel fork axle can rotate around its axis, substantial force is required to radially displace it. During landings or takeoffs, adequate forces are developed by runway contact so that the tail wheel orients itself normally. During flight, however, forces from wind, for example, are inadequate to rotate the tail wheel, and shimmy and vibration is avoided. Preferably the nut is tightened to approximately one hundred foot pounds of torque to preload the assembly. This "pre-load" prevents the tail wheel from swinging freely and shimmying or vibrating. Uncontrolled shimmying results in dangerous vibration that can cause damage if continued unabated.

This synergistic "pre-loading" of the stressed bearing actually acts as a "brake" that makes it impossible for the tail wheel to shimmy and shake uncontrollably during the critical takeoff and landing rolls. The special bushing assures that the torque remains constant during normal operations.

Thus a basic object is to provide a shimmy-free tail wheel conversion system that can be easily retrofitted to existing tail wheel assemblies.

Another basic object is to provide an after-market system for stabilizing aircraft tail wheels to minimize shimmying and vibration.

Another important object is to provide a tail wheel mounting conversion of the character described that is suitable for user-installation.

Conversely, an important object is to provide a system of the character described that can be installed with new aircraft.

Yet another object is to provide a bushing construction for a system of the character described that both radially centers and axially stresses the bearings.

Another basic object is to provide a highly stable and impact-resistant tail wheel conversion for prior art aircraft tail wheels and forks.

Another important object is to provide an aircraft tail wheel assembly of the character described that makes it easier to take off and land, especially on irregular dirt runways or grass landing strips.

A related object is to minimize jarring or jerking effects.

A still further object is to minimize noise, and maximize strength.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
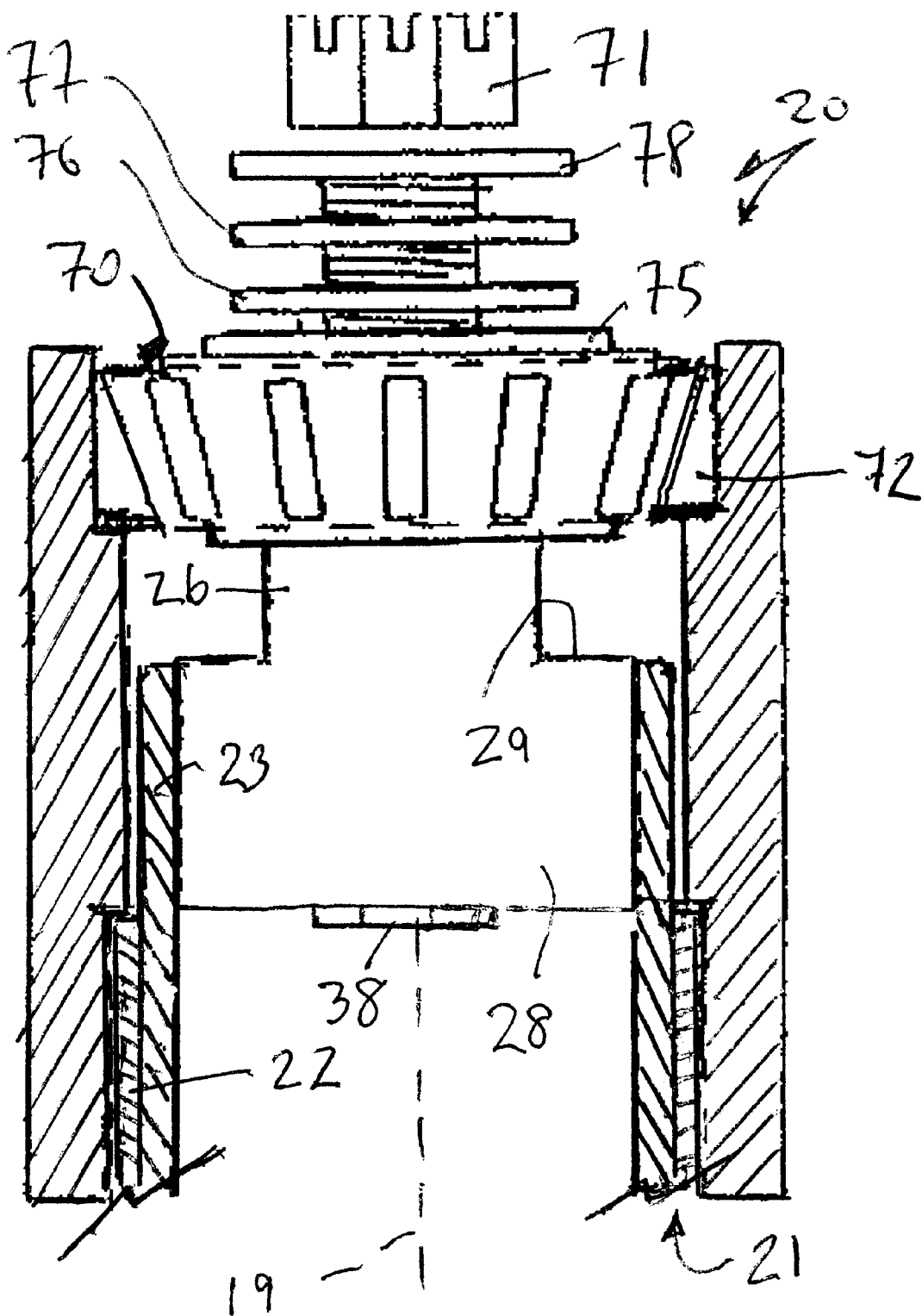
FIG. 1 is a fragmentary, longitudinal sectional view of the preferred conversion system assembled upon a conventional fork tube.

This application is a continuation-in-part of my prior application Ser. No. 09/520,041, filed Mar. 7, 2000, and entitled Shimmy-Free Aircraft Tail Wheel Assembly, the disclosure of which is hereby incorporated by reference for purposes of disclosure.

Referring now to the drawings, my shimmy-free aircraft tail wheel conversion has been generally designated by the reference numeral 20. System 20 is retrofitted to an original factory fork assembly, a tubular, upwardly projecting portion of which is generally designated by the reference numeral 21. Assembly 21 comprises an outer, hollow rigid tube 22 and a coaxially centered tube 23 that extends upwardly and outwardly from it. A typical small aircraft tail wheel assembly presenting an upper tube assembly 21 for mounting of the invention is provided, for example, by an Air Tractor-brand Model 602-802. As will be recognized by those skilled in the art, many other tail wheel designs upon which the invention may be fitted exist.

Figure 2:
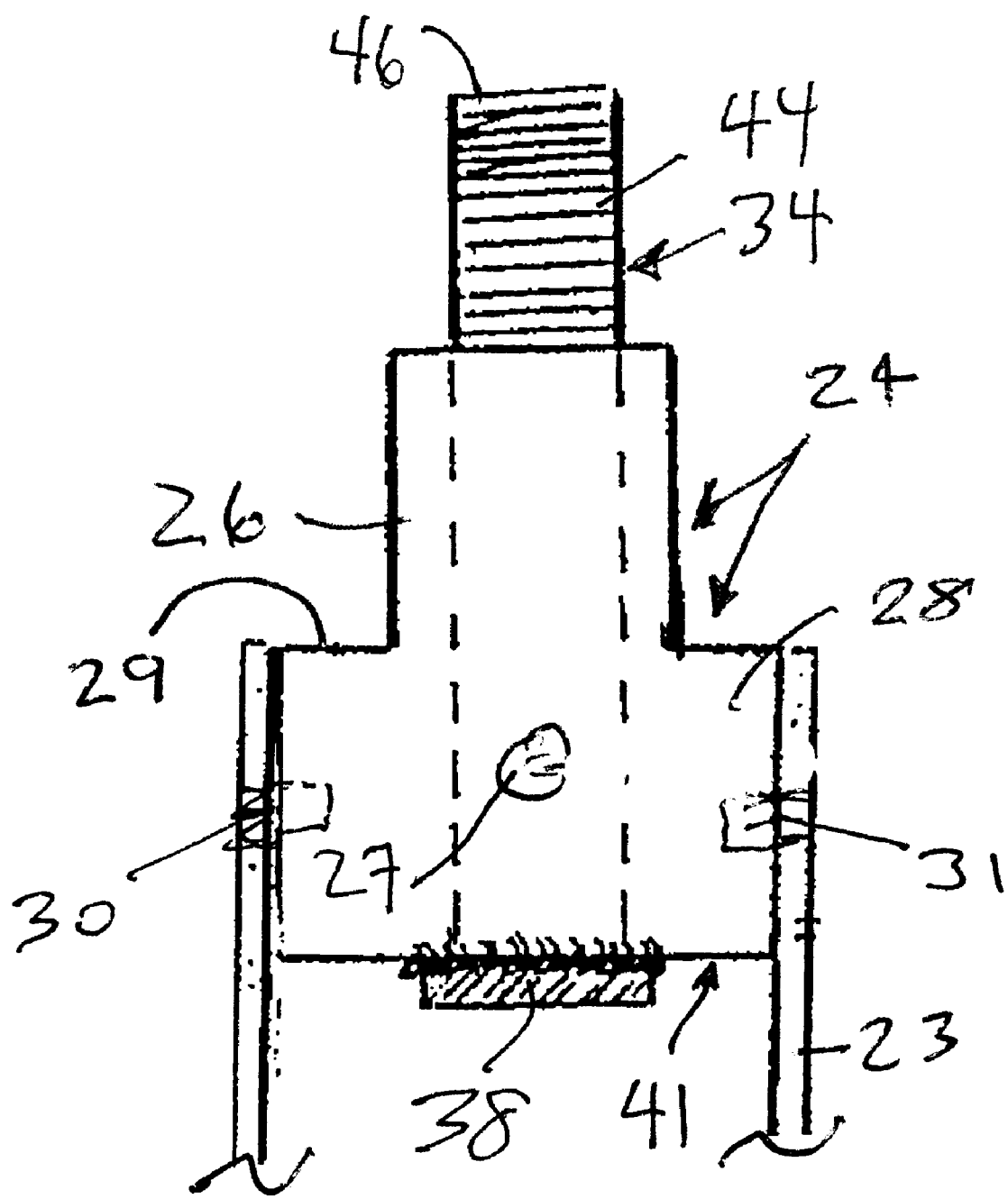
FIG. 2 is a fragmentary, longitudinal sectional view of the preferred insert, and, FIG. 3 is a longitudinal sectional view of the preferred hub.

The preferred conversion system 20 comprises a rigid insert 24 that is coaxially inserted into and pressed within the end of tube 23, concentrically with respect tubes 22 and 23. Rigid insert (FIG. 2) 24 is generally in the form of an inverted T, with an integral, coaxially-centered stem 26 projecting upwardly from a cylindrical base 28. Stem 26 has a diameter less than the diameter of base 28, and an annular coaxial shoulder 29 is defined therebetween. In assembly, shoulder 29 (FIG. 2) is flush with the end of tube 23. Base 28 is coaxially centered within tube 23 and welded in place. From the factory, the original tube assembly 21 comprises two, radially spaced-apart holes 27 that are 0.375 inches in diameter. Two more similar, radially spaced apart holes are drilled, and four plugs (i.e., like ) plugs 30, 31 (FIG. 2) are press fitted within the drilled holes and welded in place.

An elongated, threaded bolt 34 coaxially penetrates insert 24. As seen in FIG. 1, this bolt is coaxial with the centerline 19 of the assembly. The head 38 is welded to the circular undersurface 41 of the insert base 28. The threaded shank 44 extends upwardly through the insert 24, terminating in an upper, outer end 46 exposed for connection of a suitable nut. As later described, a bearing assembly surmounts stem 26.

Figure 3:
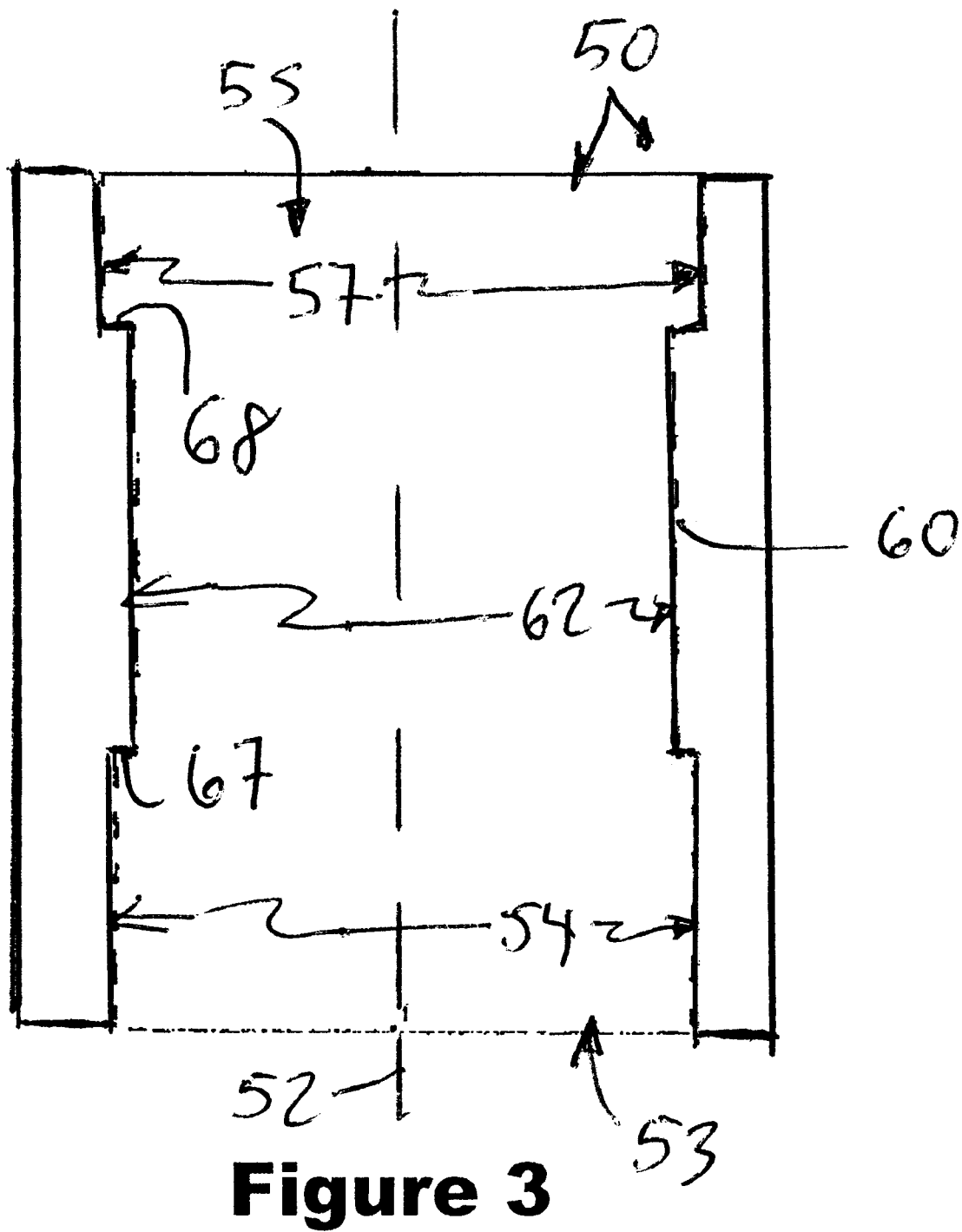

The conversion assembly 20 also comprises a rigid, hollow hub 50 (FIGS. 1, 3). The longitudinal axis 52 of hub 50 is coaxial with bolt 34 and centerline 19 in assembly. Hub 50 has a bottom open end 53 with a diameter 54 and an upper, open end 55 with an internal diameter 57, that equals diameter 54. An internal, annular reduced diameter portion 60 of the hub comprises a diameter 62 that is smaller than diameters 54, 57. Lower and upper internal shoulders 67 and 68 are formed at opposite internal ends of the thicker internal portion 60 of the hub.

In assembly (FIG. 1) hub 50 is placed over the end of tube assembly 21, coaxially surrounding the insert 24. Lower hub shoulder 67 (FIG. 3) abuts the top of tube 22. Tube assembly with tube 23 flushly, coaxially centered within reduced diameter hub portion 62. A bearing assembly 70 is fitted within hub end 55, with its race 72 coaxially seated against shoulder 68. A suitable fastener, preferably a castellated nut 71, engages threaded shaft 44, pressing against a centering bushing 75 and spacer washers 76, 77 and 78 that are all coaxially captivated by the shaft 34. Nut 71 presses down against the bearing assembly, and normally resists relative rotation. Bushing 75 aids in axially pressuring and radially centering the bearings when they are compressed together.

While the tail wheel fork axle can rotate around its axis, substantial force is required to radially displace it. During landings or takeoffs, adequate forces are developed by runway contact so that the tail wheel orients itself normally. During flight, however, forces from wind, for example, are inadequate to rotate the tail wheel, and shimmy and vibration is avoided. Preferably the nut is tightened to approximately one hundred foot pounds of torque to preload the assembly. This "pre-load" prevents the tail wheel from swinging freely and shimmying or vibrating. Uncontrolled shimmying results in dangerous vibration that can cause damage if continued unabated.

This synergistic "pre-loading" of-the-stressed-bearing actually acts as a "brake" that makes it impossible for the tail wheel to shimmy and shake uncontrollably during the critical takeoff and landing rolls. The special bushing assures that the torque remains constant during normal operations.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. An aircraft tail wheel conversion for retrofitting to a tail wheel fork tube, the conversion comprising:

a rigid, insert adapted to be coaxially received within said tail wheel fork tube, the insert terminating in an exposed end adapted to receive a suitable fastener for securing the conversion;

a rigid, hollow hub adapted to be coaxially fitted over said insert and said fork tube, the hub comprising a lower internal shoulder that forcibly contacts the insert in assembly, and an upper, coaxial and spaced apart shoulder;

a bearing assembly adapted to be coaxially centered within said upper shoulder of said hub;

a fastener mated to said insert for pressuring said bearing assembly to normally prevent the tube from rotating; and, whereby the tail wheel fork is enabled to rotate to compensate for stress forces experienced by said tail wheel, while the tail wheel is secured against vibration in flight.

2. The conversion as defined in claim 1 wherein the insert is generally shaped in the form of an inverted T, comprising an integral, coaxially-centered stem projecting upwardly from a cylindrical base.

3. The conversion as defined in claim 2 wherein the insert comprises a coaxial shoulder defined between the base and the stem, said coaxial insert shoulder contacted by said lower internal hub shoulder in assembly.

4. The conversion as defined in claim 3 wherein the insert comprises a coaxially centered, upwardly projecting bolt.

5. An aircraft tail wheel conversion for retrofitting to a tail wheel fork tube, the conversion comprising:

a rigid, inverted T-shaped insert adapted to be internally secured to said tail wheel fork tube, the insert comprising a cylindrical base coaxially fitted within the tube, a reduced diameter stem projecting coaxially upwardly from said base, an annular shoulder defined between the base and the stem, and a shaft coaxially extending though the base and the stem for receiving a suitable fastener;

a rigid, hollow hub adapted to be coaxially fitted over said insert and said fork tube, the hub comprising a lower, internal shoulder that forcibly contacts the insert shoulder in assembly, and an upper, coaxial and spaced apart hub shoulder;

a bearing assembly adapted to be coaxially centered and pressed within said upper shoulder of said hub;

a fastener mated to said insert shaft for pressuring said bearing assembly to normally prevent the fork tube from rotating; and, whereby the tail wheel fork is enabled to rotate to compensate for stress forces experienced by said tail wheel, while the tail wheel is secured against vibration in flight.

6. The conversion as defined in claim 5 wherein the insert shaft comprises a coaxially centered, upwardly projecting, threaded bolt.

\* \* \* \* \*